United States Patent [19]

Hoffmann et al.

[11] 4,158,459

[45] Jun. 19, 1979

[54] PICK-UP ARMS FOR RECORD PLAYERS

[75] Inventors: Günter Hoffmann, Hofheim; Klaus Ramspeck, Frankfurt am Main, both of Fed. Rep. of Germany

[73] Assignee: Braun Aktiengesellschaft, Kronberg, Fed. Rep. of Germany

[21] Appl. No.: 877,661

[22] Filed: Feb. 14, 1978

[30] Foreign Application Priority Data

Feb. 17, 1977 [DE] Fed. Rep. of Germany ....... 2706720

[51] Int. Cl.² .............................................. G11B 3/10
[52] U.S. Cl. .................................................. 274/23 R
[58] Field of Search .............................. 274/23 R, 37

[56] References Cited

U.S. PATENT DOCUMENTS

| | | | |
|---|---|---|---|
| 2,506,692 | 5/1950 | Thompson | 274/23 R |
| 2,776,144 | 1/1957 | Nichols | 274/23 R |
| 3,271,035 | 9/1966 | Johnston | 274/23 R |
| 3,417,999 | 12/1968 | Freier | 274/23 R |

FOREIGN PATENT DOCUMENTS 1036431 7/1966 United Kingdom .................. 274/23 R

*Primary Examiner*—Richard E. Aegerter
*Assistant Examiner*—John W. Shepperd
*Attorney, Agent, or Firm*—Fishman and Van Kirk

[57] ABSTRACT

Pick-up arms for record players including an elongated tubular arm and a weight device which can be fitted from above to one end of the arm for balancing the arm. The weight device includes two halves each of which includes a weight element, the weight elements being movable laterally to allow for displacement of the center of gravity of the weight device. The weight device is capable of being mounted on the elongated arm such that substantially the entire weight device is positioned below the uppermost surface of the arm to provide a low profile pick-up arm. The second end of the elongated arm includes a pick-up mounting fixture affixed thereto, substantially the entire fixture being positioned below the upper surface of the tubular arm to provide a low profile pick-up arm.

16 Claims, 7 Drawing Figures

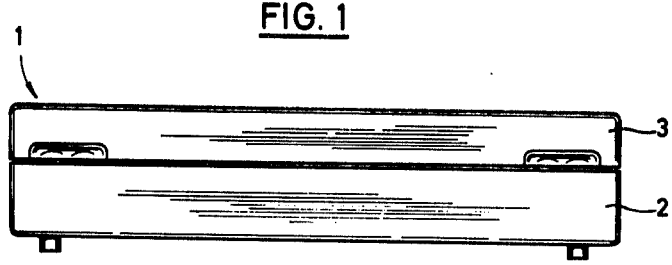
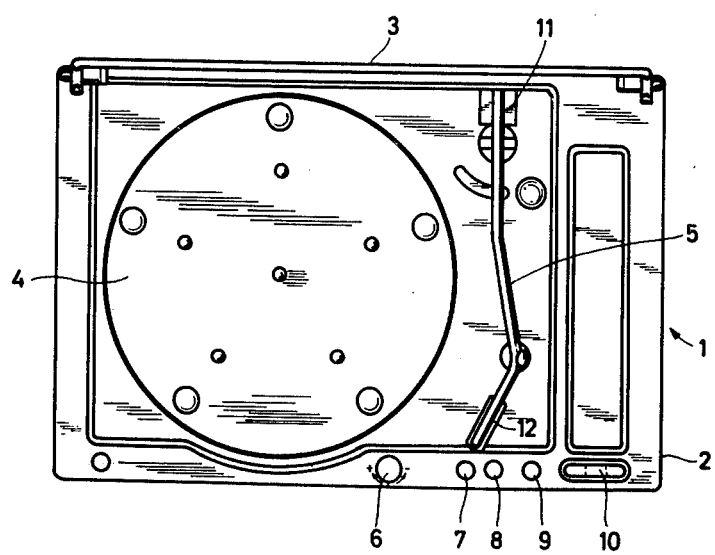

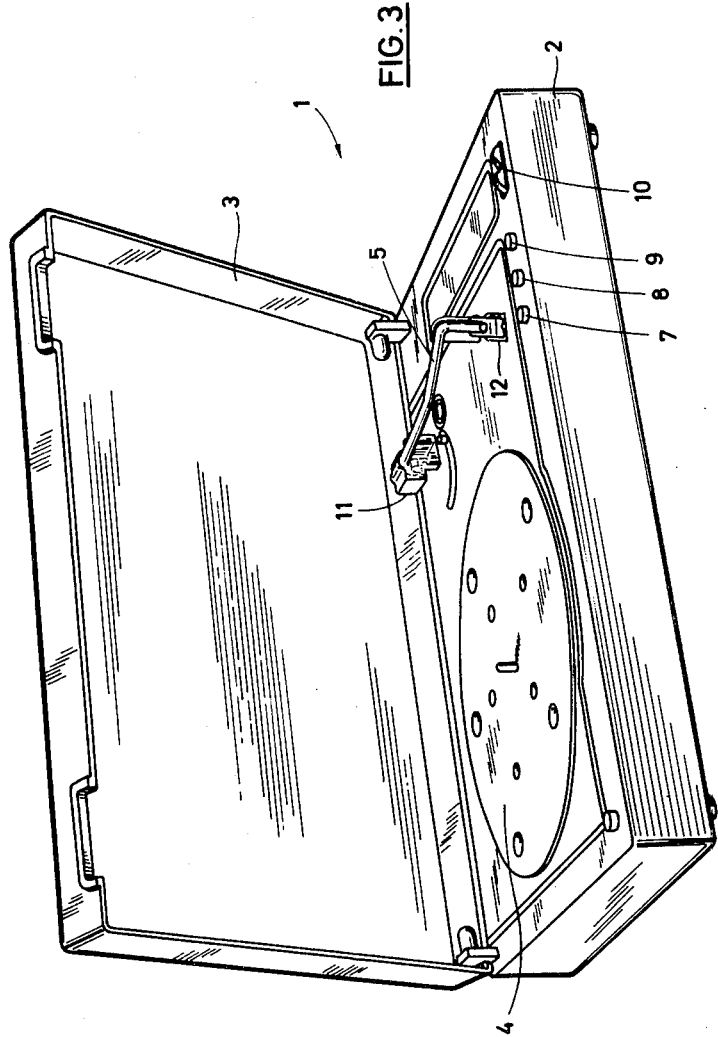

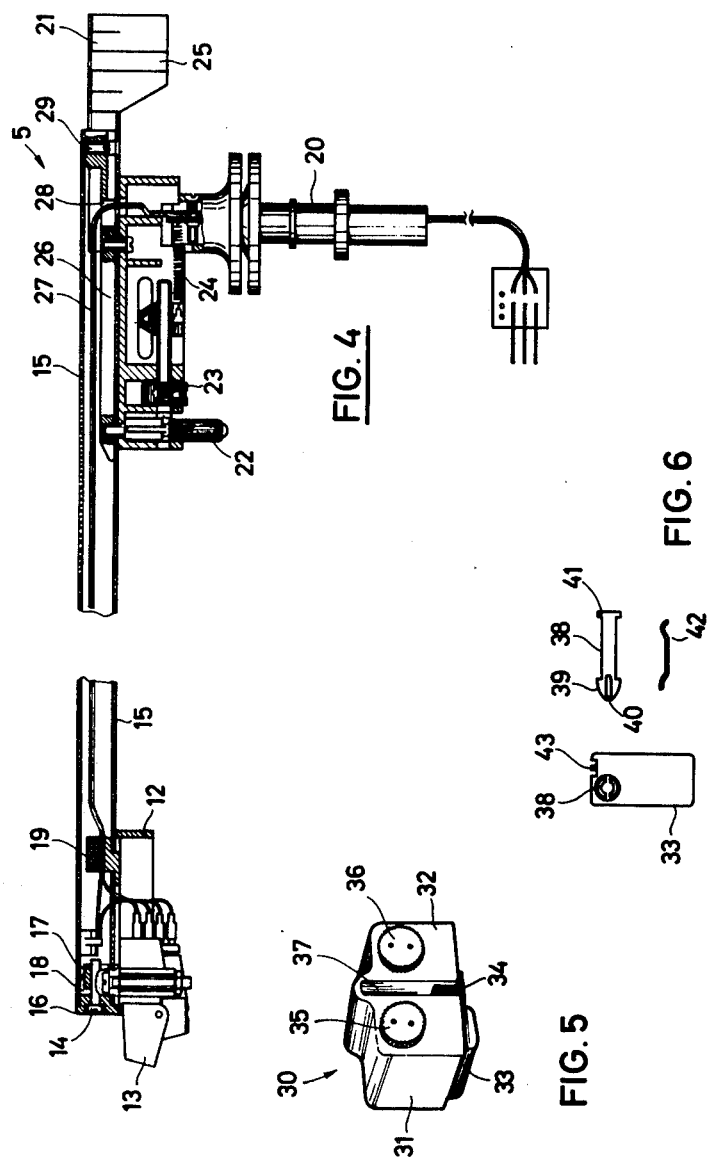

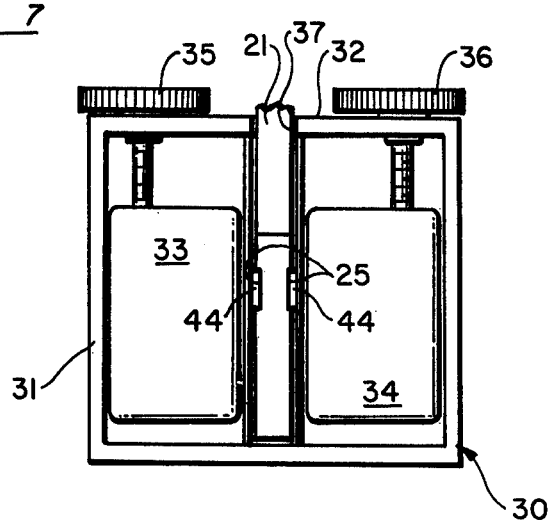

PICK-UP ARMS FOR RECORD PLAYERS

BACKGROUND OF THE INVENTION (1) Field of the Invention

The invention relates to pick-up or tone arms for record players.

(2) Description of the Prior Art

Known pick-up arms include an elongated tubular arm with a weight device for balancing the arm attached to one end and a pick-up mounting fixture for holding pick-up cartridge attached to the other end. In known pick-up arms, the weight device for balancing the arm and the pick-up mounting fixture extend upwardly above the upper surface of the elongated arm to provide a bulky pick-up arm which extends a considerable distance from the upper surface of a record player chassis to which the pick-up arm is mounted. Thus, it is difficult to provide a record player having a low profile.

With conventional pick-up arms, the weight device must be adjusted to balance the pick-up arm subsequent to the attachment of the pick-up cartridge to the pick-up mounting fixture. Thus, it is complicated to assemble a balanced pick-up arm in that a user who is generally unfamiliar with pick-up arms must attach the pick-up cartridge to the pick-up mounting device and then must precisely balance the pick-up arm by adjusting the center of gravity of the weight device.

Prior art record players generally comprise a record player base, a movable cover which is hinged at one side of the base, a turntable for records and a pick-up arm. In record players where the pick-up arm is assembled by the user, the weight device is mounted on the pick-up arm near the hinged cover. The weight device is usually mounted from behind the pick-up arm. This mounting is very difficult because there exists very little space between the end of the pick-up arm and the hinged cover. Thus, the mounting of the weight device by users who are unfamiliar with tone arms can be a time consuming and arduous task.

One object of the present invention is to provide a pick-up arm having a low profile so that a low-profile record player can be provided.

It is another object of the present invention to provide a weight device that may be mounted on the pick-up arm from above.

It is another object of the present invention to provide a weight device which can be adjusted prior to the mounting of the weight device on the pick-up arm.

SUMMARY OF THE INVENTION

The present invention provides a pick-up arm for a record player including an elongated arm and a weight device which can be mounted from above to one end of the pick-up arm for balancing of the pick-up arm. The weight device includes weight elements which may be moved laterally within the weight device to deplace the center of gravity of the weight device.

In one embodiment of the invention the weight device includes two halves each including a weight element provided with a hole in which a spindle is located. The spindle is capable of rotation to move the weight element laterally thereby allowing for displacement of the center of gravity of the weight device. The center of gravity of the weight device may be adjusted so as to balance the pick-up arm prior to the mounting of the weight device on the pick-up arm. The weight device is capable of being mounted on the elongated arm such that substantially the entire weight device is positioned below the uppermost surface of the elongated arm to provide a low profile pick-up arm. A pick-up mounting fixture is attached to the other end of the elongated arm such that substantially the entire fixture is positioned below the uppermost surface of the arm to provide a low profile pick-up arm.

The weight device can be mounted on the pick-up arm from above. One end of the pick-up arm includes a vane which has a vertical guide groove thereon. The weight device includes a projection which is complimentary to the guide groove and the weight device can be slid downwardly onto the vertical guide groove to mount the weight device on the vane.

DESCRIPTION OF THE DRAWINGS

FIG. 1 is a front elevational view of a low profile record player with its hood closed;

FIG. 2 is a plan view of the record player shown in FIG. 1 with its hood raised;

FIG. 3 is a perspective view of the record player shown in FIGS. 1 and 2;

FIG. 4 is a sectional view of a pick-up arm of the record player shown in FIGS. 1, 2 and 3;

FIG. 5 is a perspective view of the weight device shown in FIGS. 2 and 3; and

FIG. 6 shows a weight element for the weight device shown in FIG. 5.

DETAILED DESCRIPTION OF THE INVENTION

As shown in FIG. 1 record player 1 has a very low profile and allows little head room for a pick-up arm. Record player 1 includes base 2 which contains conventional device and control elements, and hood 3 which is capable of being raised and which is hinged to the back of base 2. Base 2 of record player 1 includes turntable 4 and various controls 6, 7, 8, 9 and 10 for controlling the operation of turntable 4 and pick-up arm 5. Pick-up arm 5 includes weight device 11 mounted on one end and pick-up mounting fixture 12 mounted on the other end.

As can be seen in FIGS. 1, 2 and 3, the upper surface of hood 3 when the hood is in the closed position as shown in FIG. 1 is disposed a relatively short distance from base 2 to provide a record player having a low profile. Thus, it is necessary to provide a pick-up arm which extends upwardly only a short distance from base 2.

As shown in FIGS. 2 and 3 tone arm 5 terminates only a short distance from hood 3 when hood 3 is in the open position. This close proximity between hood 3 and pick-up arm 5 provides very little space behind pick-up arms to mount weight device 11 on pick-up arm 5. Also, once weight device 11 is mounted on pick-up arm 5, there is very little space to adjust the center of gravity of the weight device 11 so that it is desirable to provide a preadjusted weight device. Weight device 11 can have its center of gravity adjusted prior to installment on pick-up arm 5 so that the pick-up arm 5 is balanced when pick-up mounting fixture 12 and the pick-up cartridge are mounted on the pick-up arm.

Referring to FIG. 4, pick-up arm 5 includes an elongated arm 15 which is preferably tubular, weight device 11 having an adjustable center of gravity and pick-up mounting device 12 to which pick-up cartridge 13 can be attached. Pick-up cartridge 13 functions to transcribe the grooves in a record to be played into electrical signals. Pick-up mounting device 12 can be attached to one end of elongated arm 15 and includes cylindrical end body portion 16 which can be inserted into the open end of elongated tubular arm 15 in plug and socket fashion. End body portion 16 is formed with a wedge-shaped recess into which a wedge-shaped piece 17, preferably made out of metal and having a tap hole therein, is inserted. By screwing screw 14 into wedge-shaped piece 17, sides 18 of wedge-shaped piece 17 are forced apart and press end body portion 16 against the inner wall of elongated tubular arm 15. Elongated tubular arm 15 includes an aperture in the tubular wall of arm 15 and pick-up mounting device 12 includes securement part 19 which fits upwardly and engages the aperture. The thickness of part 19 is less than the width of the aperture so that pick-up mounting device 12 can be swivelled through a given angle about the longitudinal axis of elongated tubular arm 15 to permit minor corrections in the position of pick-up mounting device 12. Pick-up mounting device 12 is attached firmly to elongated tubular arm 15 in a manner in which substantially the entire device 12 is positioned below the upper surface of elongated tubular arm 15 is provide a pick-up arm 5 having a low profile.

Toward the end of elongated tubular arm 15 is bearing 20 for balancing pick-up arm 5, height adjustment device 22 for adjusting the height of elongated tubular arm 15 and contact force adjustment device 23. The height adjustment device 22 rests on a device (not shown) for lowering and raising pick-up arm 5 mechanically. By rotating height adjustment device the vertical position of pick-up arm 5 can be adjusted. Contact adjustment device 23 permits adjustment of the force exerted by spring 24 which in turn permits adjustment of the force of the needle of pick-up cartridge 13 on a record.

Vane 21 is mounted on the end of elongated tubular arm 15 and provides structure which allows weight device 30 to be mounted on elongated tubular arm 15 from above. The upper edge of vane 21 is recessed from the upper surface of elongated tubular arm 15 to provide a recess which allows weight device to be mounted on vane 21 in a manner such that substantially the entire weight device is positioned below the upper surface of elongated tubular arm 15. Vane 21 includes vertical guide groove 25 for acceptance of an elongated vertical protrusion on weight device 30. Vane 21 includes plug part 26 which is inserted into the open end of elongated tubular arm 15 in a plug and socket fashion. The plug part 26 is formed so that electric leads 27 can be led past it and has opening 28 through which these leads may be led downwardly into base 2 of record player 1. Plug part 26 is attached firmly to elongated tubular arm 15 by screw 29. As mentioned earlier, there exists only a small space between the end of pick-up arm 5 and hood 3 of record player 1 so that it would be difficult to mount a weight device from the rear of pick-up arm 5. In accordance with the present invention, weight device 30 can be mounted on pick-up arm 5 from above by pushing weight device 30 downwardly onto vane 21.

Weight device 30 as it is shown in perspective in FIG. 5 includes halves 31 and 32 which are preferably substantially symmetrical. Halves 31 and 32 include respectively weight elements 33 and 34 which are preferably made of lead and which are capable of being displaced axially by the turning of knurled wheels 35 and 36. Halves 31 and 32 of weight device 30 are separated from each other by gap 37. Gap 37 between halves 31 and 32 is bridged at the upper ends of halves 31 and 32.

Included within gap 37 is an elongated vertical protrusion (not shown) which is capable of engaging groove 25 of vane 21 and securing weight device 30 to vane 21. FIG. 6 shows weight element 33 which is disposed within the cavity of half 31 of weight element 30. In FIG. 6, weight element 33 is shown with plastic bush 38. Plastic bush 38 includes compressible point 39 including two halves separated by gap 40 at one end and stop 41 at the other end. Compressible point 39 of plastic bush 38 is inserted into the hole of weight element 33 from behind as viewed in FIG. 6. During insertion, the two halves of compressible point 39 are pressed together until compressible point 39 reaches a part of the opening which is widened outwardly so as to allow compressible point 39 to spread apart. The halves when spread apart from one another in a barb-like manner retain plastic bush 38 in the hole. Knurled wheel 39 is mounted on screw-threaded members (not shown) which can be screwed through a hole (not shown) in bush 38. By rotating knurled wheel 36, weight element 33 is displaced laterally, thus causing displacement of the center of gravity of pick-up arm 5. So that weight element 33 does not tilt within its cavity as a result of rotation of knurled wheel 36, spring 42 having a hole which engages projection 43 on weight element 33 is provided. Weight element 34 also includes a similar spring and projection arrangement.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A pick-up arm for a record player comprising an elongated arm having a first end and a second end and movable about a pivot positioned intermediate the ends, pick-up means mounted to the first end, a weight device for balancing the pick-up arm, guide means positioned on the second end of the elongated arm a predetermined distance from the pivot, the weight engaging the guide means to position the weight the predetermined distance from the pivot.

2. A pick-up arm according to claim 1, wherein said weight device includes a means for deplacing the center of gravity of the weight device.

3. A pick-up arm according to claim 2, wherein the weight device comprises two halves each of which includes a weight element provided with a hole and a spindle located in said hole, the spindle capable of rotation to move the weight element laterally to allow for deplacement of the center of gravity of the weight device, the two halves defining a gap which receives the elongated arm.

4. A pick-up arm according to claim 3, wherein a knurled wheel located outside the weight device is mounted on one end of each spindle.

5. A pick-up arm according to claim 3, wherein the hole in each of the weight elements is provided with a plastic bush which includes a slot and two barbs at one end and a stop at another end.

6. A pick-up arm according to claim 5, wherein a vane is affixed to said second end of the arm and includes said guide means, said guide means extending transverse to said elongated arm, the weight device being mounted on said guide means.

7. A pick-up arm according to claim 6 wherein said guide means includes a vertical groove in said vane and wherein said weight device engages said groove to secure said weight device to said elongated arm.

8. A pick-up arm according to claim 7 wherein said elongated arm is tubular and said vane includes a plug part extending from one end thereof, said plug part being inserted into the tubular arm.

9. A pick-up arm according to claim 8, and further including electrical leads and wherein the plug part is formed so that it does not completely fill the entire inner space of the tubular arm whereby the electrical leads can be led through the tubular arm.

10. A pick-up arm for a record player according to claim 1 wherein a pick-up mounting fixture is affixed to the first end of the arm and located below the arm, and the pick-up means being mounted on said fixture.

11. A pick-up arm according to claim 10 wherein the elongated arm is tubular and further including an aperture on the underside of the tubular arm near said first end thereof and a securement part attached to the fixture and being engaged in the aperture to secure the fixture to the tubular arm.

12. A pick-up arm according to claim 1 wherein the guide means extends in a direction transverse to the elongated tone arm and wherein the weight slideably engages the guide means.

13. A pick-up arm for a record player comprising an elongated arm having a first end and a second end and including an uppermost surface, the elongated arm being movable about a pivot positioned intermediate the ends, pick-up means mounted to said first end, a weight device for balancing the pick-up arm and being mounted to the second end of the arm, said weight device comprising two halves defining a gap, the two halves being interconnected by a bridge, each half including a means for deplacing the center of gravity of the weight device, said bridge engaging said elongated arm to provide a pick-up arm wherein substantially the entire weight device is positioned below the uppermost surface of the arm to provide a low profile pick-up arm.

14. A pick-up arm according to claim 13, wherein a vane is affixed to said second end of the arm and includes a vertical guide means positioned a predetermined distance from the pivot, the weight device being mounted on said guide means.

15. A pick-up arm according to claim 14 wherein said guide means includes a vertical groove in said vane and wherein said weight device engages said groove to secure said weight device to said elongated arm.

16. A pick-up arm according to claim 15 wherein said elongated arm is tubular and said vane includes a plug part extending from one end thereof, said plug part being inserted into the tubular arm.

* * * * *

UNITED STATES PATENT AND TRADEMARK OFFICE
CERTIFICATE OF CORRECTION

PATENT NO. : 4,158,459

DATED : June 19, 1979

INVENTOR(S) : Gunter Hoffman, et al

It is certified that error appears in the above-identified patent and that said Letters Patent are hereby corrected as shown below:

Column 2, line 26, delete "and" (second occurrence)

Column 2, line 28, after "5" delete the period (.) and insert --; and--

Column 2, between lines 28 and 29, insert the following paragraph:

--FIGURE 7 is a bottom view of the weight device shown in FIGURE 5 secured to the pick-up arm shown in FIGURE 4.--

Column 2, line 63, delete "weight device"

Column 2, line 64, delete "11 having an adjustable center of gravity".

Column 3, line 36, change "Vane 21 is" to --Arm 15 also includes a vane 21--.

Column 3, line 37, change "and" to --which--

Column 3, line 38, after "30" insert --(identical to 11 in FIGURES 2 and 3)--.

Column 3, line 44, delete "Vane 21 includes vertical".

UNITED STATES PATENT AND TRADEMARK OFFICE
CERTIFICATE OF CORRECTION

PATENT NO. : 4,158,459

DATED : June 19, 1979

INVENTOR(S) : Gunter Hoffman, et al

It is certified that error appears in the above-identified patent and that said Letters Patent are hereby corrected as shown below:

Column 3, line 45, delete in its entirety.

Column 3, line 46, delete "protrusion on weight device 30."

Column 3, between lines 59 and 60, insert the following paragraph:

--As shown in FIGURE 7, the weight device 30 is secured to vane 21. Vane 21 includes two vertical guide grooves 25 which receive respectively two elongated vertical protrusions 44 on the weight device. The vertical guide grooves 25 on vane 21 are located a predetermined distance from the pivot of the pick-up arm and the weight device may be slid downwardly so that the vertical protrusions 44 are engaged by the guide grooves 25 to position the weight device the predetermined distance from the pivot.--

Column 4, line 36 (Claim 1, line 2), after "end" (first occurrence) insert --portion--

Column 4, line 36 (Claim 1, line 2), after "end" (second occurrence) insert --portion, said arm defining and axis--.

UNITED STATES PATENT AND TRADEMARK OFFICE
CERTIFICATE OF CORRECTION

PATENT NO. : 4,158,459
DATED : June 19, 1979
INVENTOR(S) : Gunter Hoffman, et al It is certified that error appears in the above-identified patent and that said Letters Patent are hereby corrected as shown below:

Column 4, line 36 (Claim 1, line 2), after "and" (second occurrence) insert --being--.

Column 4, line 37 (Claim 1, line 3) change "ends" to --said first and second end portions--.

Column 4, line 38 (Claim 1, line 4), after "end" insert --portion of said arm--.

Column 4, line 41 (Claim 1, line 7), after "pivot," insert --said guide means being at a substantial angle with respect to the axis of the elongated arm,--

Column 4, line 41 (Claim 1, line 7), after "weight" insert --device including engagement means cooperating with said guide means, the engagement means slidably--.

Column 4, line 42 (Claim 1, line 8) after "weight" insert --device--

Column 5, line 23 (Claim 12, line 2) after "the" insert --axis of--

UNITED STATES PATENT AND TRADEMARK OFFICE
CERTIFICATE OF CORRECTION

PATENT NO. : 4,158,459
DATED : June 19, 1979
INVENTOR(S) : Gunter Hoffman, et al It is certified that error appears in the above-identified patent and that said Letters Patent are hereby corrected as shown below:

Column 5, line 24 (Claim 12, line 3) cancel "and wherein the weight device slidably"

Column 5, line 25 (Claim 12, line 4), cancel "engages the guide means".

Signed and Sealed this

Thirteenth Day of November 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,158,459

DATED : June 19, 1979

INVENTOR(S) : Gunter Hoffman, et al

It is certified that error appears in the above—identified patent and that said Letters Patent is hereby corrected as shown below:

The attached Columns 3 and 4 should be inserted, respectively, following columns 1 and 2 as part of the above-identified patent.

THIS CERTIFICATE APPLYS TO THE GRANT. EXCLUSIVELY.

Signed and Sealed this

First Day of April 1980

[SEAL]

*Attest:*

SIDNEY A. DIAMOND

*Attesting Officer*     *Commissioner of Patents and Trademarks*